(12) United States Patent
Heule

(10) Patent No.: US 7,273,334 B2
(45) Date of Patent: Sep. 25, 2007

(54) DEBURRING CUTTER FOR DEBURRING EDGES OF DRILLED HOLES

(75) Inventor: Heinrich Heule, Au SG (CH)

(73) Assignee: Heule Werkzeug AG, Balgach (CH)

( * ) Notice: Subject to any disclaimer, the term of this patent is extended or adjusted under 35 U.S.C. 154(b) by 399 days.

(21) Appl. No.: 11/081,818

(22) Filed: Mar. 16, 2005

(65) Prior Publication Data

US 2006/0291967 A1 Dec. 28, 2006

(30) Foreign Application Priority Data

Mar. 25, 2004 (DE) .................. 10 2004 014 659

(51) Int. Cl.
*B23B 51/00* (2006.01)
(52) U.S. Cl. .............. 408/224; 408/199; 408/211; 408/223
(58) Field of Classification Search ............ 408/199, 408/200, 211, 223, 224, 713; B23B 51/00
See application file for complete search history.

(56) References Cited

U.S. PATENT DOCUMENTS

| | | | | |
|---|---|---|---|---|
| 2,364,293 A | * | 12/1944 | Hotchner | 408/155 |
| 3,827,821 A | * | 8/1974 | Swenson | 408/59 |
| 4,844,670 A | * | 7/1989 | Heule | 408/224 |
| 5,181,810 A | | 1/1993 | Heule | |
| 7,217,070 B2 | * | 5/2007 | Hecht | 408/154 |
| 2004/0005200 A1 | * | 1/2004 | Heule et al. | 408/173 |

FOREIGN PATENT DOCUMENTS

| | | |
|---|---|---|
| DE | 3839423 A1 | 5/1990 |
| DE | 197 12 377 A1 | 11/1997 |

* cited by examiner

*Primary Examiner*—Monica Carter
*Assistant Examiner*—Eric A. Gates
(74) *Attorney, Agent, or Firm*—Christa Hildebrand; Norris McLaughlin & Marcus, PA

(57) ABSTRACT

The first cutting edge can advantageously remove a large burr from the edge of a drilled hole with high effectiveness, because of the particularly aggressive cutting action of the first cutting edge. The following inclined second cutting edge advantageously allows precise chamfers to be cut, i.e., the surface and the angle of the counter bore can be precisely maintained, independent of the wear on the cutting edges. A control surface located adjacent to the cutting edge in the forward region enables a precise control of the cutter.

16 Claims, 2 Drawing Sheets

Figure 3:
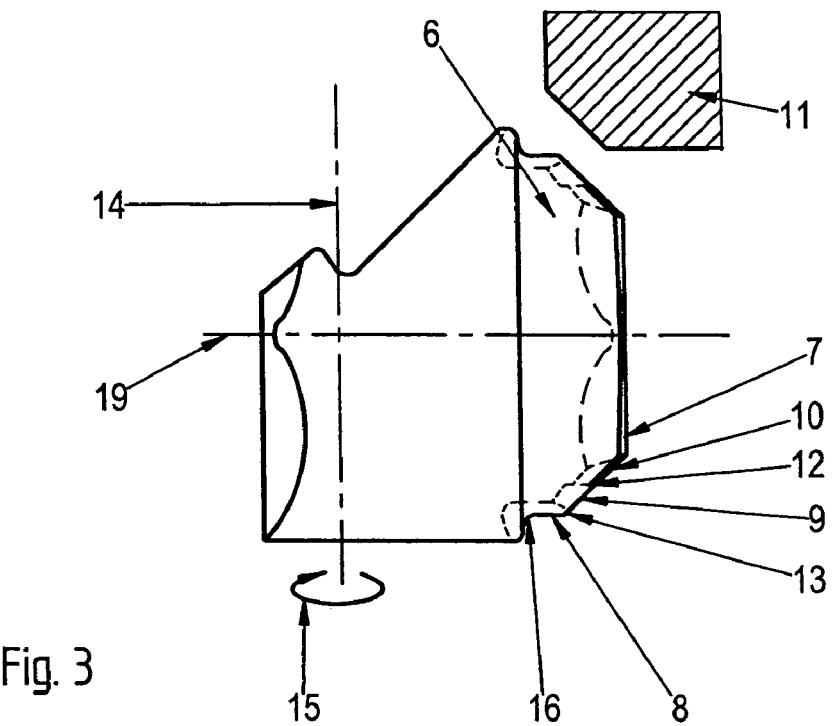

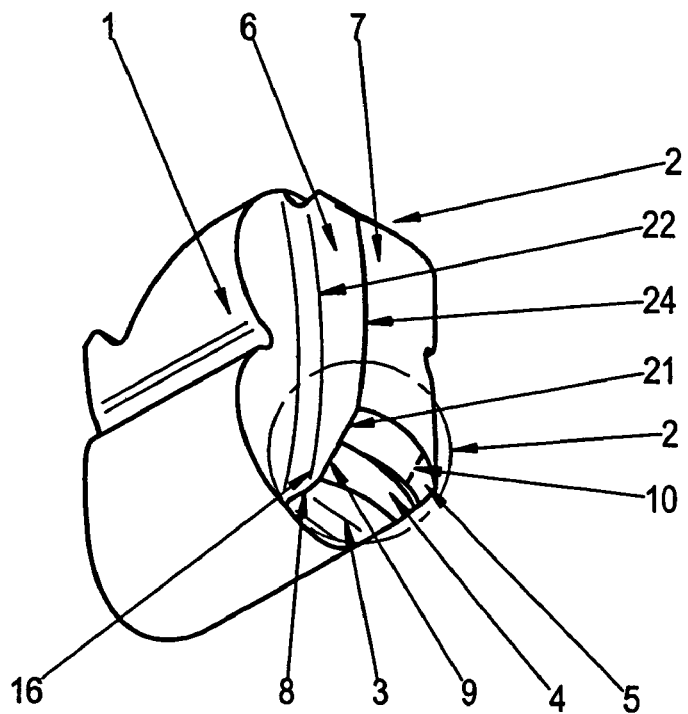
Fig. 1
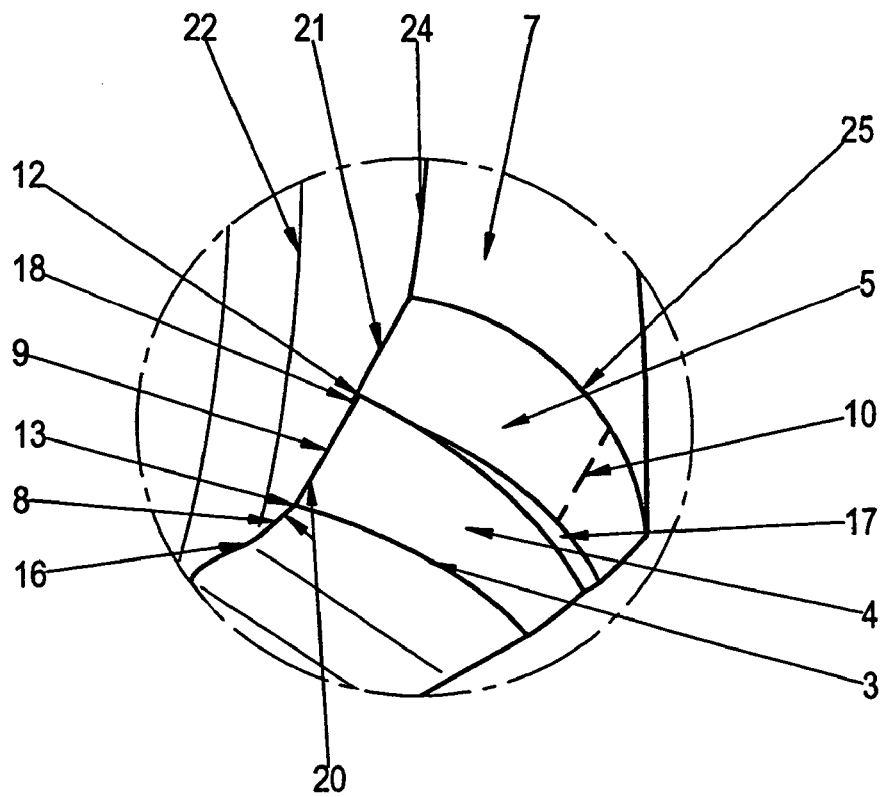
Fig. 2  2 CUTTER SECTION

DEBURRING CUTTER FOR DEBURRING EDGES OF DRILLED HOLES

BACKGROUND OF THE INVENTION

The invention is directed to a deburring cutter according to the preamble of claim 1.

A first embodiment of a cutter, known as a DEFA cutter, by the same applicant has a straight, vertical cutting edge. A control surface is disposed on the front free end of the cutting edge. The control surface is radially inwardly inclined, does not cut, and functions only as a control surface for the vertically oriented cutting edge. The inclined control surface transitions into a horizontal front end.

With the DEFA cutter, the chamfer diameter of the drilled hole to be deburred can advantageously be set very accurately and does not change during the deburring process.

This may be due to the fact that the vertical cutting edge performs an excellent cutting action as a result of the forced control by the inclined control edge located subsequent to the vertical cutting edge.

If the inclined control edge were omitted, the DEFA cutter would operate only as a countersink tool, without being centered in the drilled hole.

In another embodiment of a cutter, the so-called GHS cutter by the same applicant, a different cutting geometry was used which essentially consists of a radially inwardly inclined cutting edge that transitions on its free front end directly into an ineffectual, non-cutting end face. Unlike the DEFA cutter, this embodiment does not include the so-called control edge.

Advantageously, the GHS cutter is capable of achieving a large forward feed with excellent angular accuracy of the chamfer to be deburred. Only a small secondary edge was produced.

In this disadvantageous arrangement, the control edge has been omitted, which could cause a variable, uneven chamfer. When the cutter becomes dull, the exact chamfer diameter can no longer be guaranteed.

It is therefore an object of the invention to provide a deburring cutter for deburring edges of a drilled hole in workpieces of the aforedescribed type, which can effectively remove large burrs from the edge of the drilled hole, while accurately maintaining the chamfer or countersink geometry of the edges of the drilled hole and, in particular, of the countersink angle more or less independent of the wear of the cutting edges, whereby the cutter can be precisely controlled by a control surface.

According to the invention, a novel cutter is provided, wherein the at least one cutting section has a first cutting edge directly or indirectly followed by a second cutting edge, with a non-cutting free edge arranged after the second cutting edge indirectly via a transition, with the free edge being recessed radially toward the rotation axis with respect to the second cutting edge. The first cutting edge encloses with the rotation axis an angle in the range of approximately 45° to 120°, and the second cutting edge encloses, on one hand, with the rotation axis an angle in the range of approximately 0° to 90° and, on the other hand, with the first cutting edge an outside angle greater than 180°. A control edge is located behind the free edge, as viewed in a direction opposite the rotation direction, which has at least partially the same radial distance with respect to the rotation axis as the second cutting edge. More particularly, the free edge encloses with the second cutting edge an angle between approximately 90° and 270°. The invention relates to clockwise and counter-clockwise rotating cutters.

BRIEF SUMMARY OR THE INVENTION

Accordingly, the invention provides a novel cutter that is constructed as follows, with the following description starting from the longitudinal center axis of the base body of the cutter:

As seen in the axial direction, a first cutting edge is initially provided as an edge boundary of a first free surface, with the first cutting edge being oriented either exactly vertical or at an angle relative to the vertical. A second cutting edge, which is inclined towards the longitudinal center axis and oriented outwardly from the center of the base body of the cutter, is located directly following the free front face of the first cutting edge, forming an edge boundary of a second free face. The second cutting edge encloses an arbitrary angle between 0° and 90° with respect to the first vertical cutting edge.

A free edge forming an edge boundary of a control surface is located following the front free face of this inclined second cutting edge, with the free edge having an angle approximately equal to the angle of the inclined second cutting edge. This free edge, however, is designed to be non-cutting. However, the angle of the free edge does not necessary have to be equal to the angle of the inclined second cutting edge. The angle of the free edge can be different, for example by ±90°, from the angle of the second cutting edge.

This novel cutter achieves the advantages of the two aforementioned cutter of the applicant without having their particular disadvantages.

Advantageously, the vertical first cutter can very effectively remove an unusually large burr of the edge of the drilled hole due to its particularly aggressive cutting action.

The following inclined second cutting edge advantageously guarantees that the chamfers are formed accurately, i.e., the surface and the countersink angle can be precisely maintained, independent of the wear of the cutting edges.

The control surface of the control edge located adjacent to the front region of the second cutting edge provides precise control of the cutter.

This may be explained by the observation that the control edge of the control surface contacts the chamfer after the chamfer is completed, thus preventing additional cutting of the chamfer that is no longer desired. This approach reliably limits the cutting action on the chamfer.

The control surface with a control edge can also be viewed as "freewheeling," because the cutting action is gently terminated due to the arrangement of the control surface with the control edge.

While the approximately vertical first cutting edge operates aggressively and the adjacent inclined second cutting edge operates very precisely, the control edge located on the following control surface limits the cutting action, when the cutting action is completed.

Accordingly, an entirely novel cutter is described which combines the advantages of the aforementioned cutters, without exhibiting their disadvantages.

The invention will be described hereinafter with reference to drawings which describe a possible embodiment. Additional features and advantages of the invention can be inferred from the drawings and their description.

BRIEF DESCRIPTION OF THE SEVERAL VIEWS OF THE DRAWING(S)

It is shown in:

FIG. 1 a perspective front view of a cutter according to the invention;

FIG. 2 an enlarged view of the cutter section depicted in FIG. 1 and indicated by the reference numeral 2;

FIG. 3 an enlarged side view of the cutter; and

Figure 4:
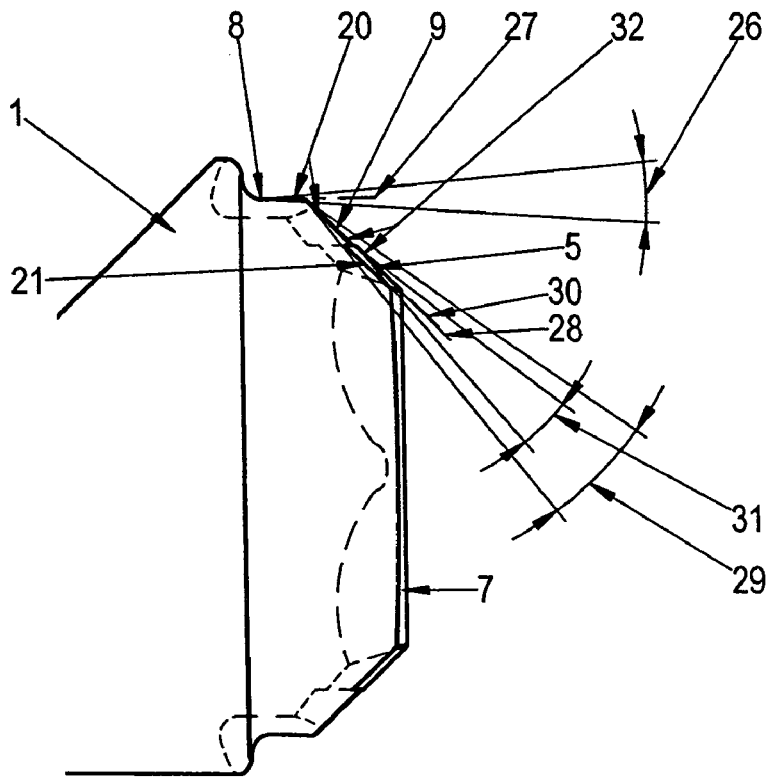

FIG. 4 a side view of the cutter depicting the formation of different angle variations.

DETAILED DESCRIPTION OF THE INVENTION

The cutter according to the invention includes cutting edges that are oriented in the forward direction (motion relative to the workpiece) and cutting edges that are oriented in the reverse direction. The cutters are hence suitable for deburring both in the forward direction and in the reverse direction. However, the invention is not limited thereto. The invention can also provide that only the cutter located on one side includes the cutting edges according to the invention, whereas the cutting edges, for example for deburring in the reverse direction, can be omitted.

The cutter 1 according to FIGS. 1 to 3 has a body that is rotatable essentially about a rotation axis 14, for example in the direction of arrow 15.

The two cutter sections for deburring in the forward and reverse direction are arranged mirror-symmetric with respect to a centerline 19.

This arrangement, however, is not required for the disclosed solution. For example, the cutter section for deburring in the forward direction can be configured differently from the corresponding cutter section for deburring in the reverse direction.

The exemplary embodiment according to FIGS. 1 to 3 shows a symmetric arrangement of the two cutter sections.

For example, a different chamfer may be cut during the forward movement than during the reverse movement, which would require the two cutter sections 2, 2 according to FIG. 1 to be shaped differently.

This relates to all geometric dimensions of the subsequently described cutter section 2.

The cutter section 2 includes a free surface 3, which is recessed from the cutting edge 8. The cutting edge 8 is also referred to as D-cutting edge and, as seen in FIG. 3, forms the vertical cutting surface, as described above in the general description. This cutting edge achieves a particularly aggressive and effective cutting action.

The free surface 3 located after the cutting edge 8 is provided only to expose the cutting edge 8.

The cutting edge 8 begins in the axial direction, as referenced to the longitudinal center axis 19, at a position 16 and extends, as described above, approximately in a vertical direction to the position 13.

As already pointed out in the general description above, the angle need not be exactly parallel to the vertical; suitable angles can range between 45° and 120°.

The straight cutting edge 8 which cuts aggressively transitions at the position 13 into another cutting edge 9, which forms an angle with the cutting edge 8 and will subsequently be referred to as S-cutting edge.

It is important that the two cutting edges 8, 9 enclose an angle 20 therebetween, which can vary over a wide range.

Advantageously, providing the angle 20 between the cutting edge 8 and the cutting edge 9 allows the cutting edge 9 to cut with high precision, because the cutting edge 9 enters the drilled hole of the workpiece 11 at an angle.

The free surface 3 associated with the cutting edge 8 therefore also transitions into a free surface 4 associated with the cutting edge 9.

These two free surfaces recede behind the aforementioned cutting edges 8, 9, thereby enabling the cutting edges 8, 9 to cut.

The inclined cutting edge 9 is in itself straight and extends to the position 12 at the transition 18 in a straight configuration.

However, the cutting edge 9 does not necessarily have to be configured as a straight line, and could also be slightly arcuate.

The cutting edge 9 extends to the position 12, where a transition 18 is formed. At the transition, the cutting edge 9 at the position 12 is located higher, in relation to the drawing plane of FIG. 2, than the adjacent lower free edge 21, which does not perform a cutting action.

The cutting edges 8, 9 and the free edge 21 form the boundaries of a chip-removal face 6, which is located below the cutting edges 8, 9 and which opens approximately conically outwardly from the position 16, between the lines 22 and 24, as seen in FIG. 1 or 2.

The free edge 21 ten continues at an angle into a line 24, which also forms the boundary of the chip-removal face 6, is also seen in FIG. 1 or 2.

It is significant that a free edge 21 located on the control surface 5 is disposed adjacent to the inclined cutting edge 9. The control surface 5 does not performs a cutting action and is bounded, on one hand, on the side of the cutting edges 8, 9 by the free edge 21 and, on the other hand, on the sides disposed opposite the cutting edges 8, 9 along the periphery opposite the rotation direction 15 by the edge boundaries of a wedge 17 formed between the free surface 4 and the control surface 5.

The wedge 17 is formed by a shoulder between the two side-by-side surfaces 4, 5 which are arranged with a height offset in the drawing plane of FIG. 2.

As a result, the control edge 10 is higher than the free surface 4, so that the control edge makes initial contact with the chamfer to be deburred.

The control edge 10 has the same height as the inclined cutting edge 9.

This provides the essential advantage of the cutter 1 according to the invention, namely that when the cutting edge 9 makes contact with the chamfer to be deburred, the control edge 10 is gently applied simultaneously or somewhat later, and the cutting edge 9 ceases to cut, but only after the desired chamfer size has been reached.

It is significant that a sliding surface 7 is arranged following the control surface 5. An arcuate edge 25 forms the boundary between the two surfaces 5, 7.

As shown in FIG. 3, the sliding surface 7 is arranged at an angle following the control surface 5 and the control edge 10 formed thereon. Accordingly, the sliding surface 7 does not perform a cutting action and also has no control function. It only terminates the front end of the cutter.

The sliding surface 7 is crowned to prevent damage during insertion in a drilled hole of the workpiece 11.

FIG. 4 illustrates a side view of the cutter according to the invention, showing different angle variations.

As illustrated, the angle 27 of the cutting edge 9 and the angle 32 of the free edge 21 can be variable.

FIG. 4 also shows the effective angle of the cutting edge 9 with the reference numerals 28; however, the angle 28 can vary in the range indicated for the variable angle 29.

It is therefore clear that the control surface 5 does not necessarily need to continue from the cutting edge 9 with the same angle, as depicted in the exemplary embodiment.

FIG. 4 shows that the exemplary effective angle 30 of the control surface 5 can also vary within the range of angle 31.

It has therefore been clearly demonstrated that the control surface 5 can be arranged subsequent to the cutting edge 9 at an angle.

LIST OF REFERENCE CHARACTERS

1 cutter
2 cutter section
3 free surface (D)
4 free surface (S)
5 control surface
6 face (for chip removal)
7 sliding surface
8 cutting edge (D)
9 cutting edge (S)
10 control edge
11 workpiece
12 position
13 position
14 rotation axis
15 direction of arrow
16 position
17 wedge
18 transition
19 centerline
20 angle
21 free edge
22 line
23 -
24 line
25 edge
26 angle, variable (cutting edge 8)
27 angle, effective (cutting edge 8)
28 angle, effective (cutting edge 9)
29 angle, variable (cutting edge 9)
30 angle, effective (control surface 5)
31 angle, variable (control surface 5)
32 angle

The invention claimed is:

1. A deburring cutter for deburring of edges of drilled holes in a workpiece, comprising at least one cutter (1) with at least one cutter section (2) having at least one cutting edge (8, 9) and at least one control surface (5), wherein the cutter (1) is received in a tool holder capable of rotation about a rotation axis (14) in at least one rotation direction (1 5), wherein the at least one cutting section (2) has a first cutting edge (8) directly or indirectly followed by a second cutting edge (9), with a non-cutting free edge (21) arranged after the second cutting edge (9) indirectly via a transition (18), with the free edge (21) being recessed radially toward the rotation axis (14) with respect to the second cutting edge (9), wherein the first cutting edge (8) encloses with the rotation axis (14) an angle in a range of approximately 45° to 120°, and wherein the second cutting edge (9) encloses with the rotation axis (14) an angle in a range of approximately 0° to 90° and with the first cutting edge (8) an outside angle (20) greater than 180°.

2. The deburring cutter according to claim 1, wherein, when viewed opposite the rotation direction (15), a control edge (10), which is located at least partially on the same conical surface with respect to the rotation axis (14) as the second cutting edge (9), is located behind the free edge (21).

3. The deburring cutter according to claim 2, wherein the first cutting edge (8), the second cutting edge (9), and the free edge (21) are arranged, in that order, radially from the inside to the outside with respect to the rotation axis (14).

4. The deburring cutter according to claim 1, wherein the free edge (21) encloses with the second cutting edge (9) an angle (32) in the range of approximately 90° to 270°.

5. The deburring cutter according to claim 1, wherein the first cutting edge (8), the second cutting edge (9), and the free edge (21) are arranged, in that order, radially from the inside to the outside with respect to the rotation axis (14).

6. The deburring cutter according to claim 1, wherein the cutting edges (8, 9) and/or the free edge (21) are straight or arcuate.

7. The deburring cutter according to claim 1, wherein the cutter (1) has two cutter sections (2) which makes the cutter suitable for deburring in the forward as well as the reverse direction.

8. The deburring cutter according to claim 7, wherein the two cutter sections (2) are arranged axially symmetric with respect to the longitudinal center axis (19) of the cutter (1) and/or point-symmetric with respect to a point on the longitudinal center axis (19) of the cutter (1).

9. The deburring cutter according to claim 1, wherein, when viewed opposite the rotation direction (15), a free surface (3, 4) is located behind the first cutting edge (8) and/or the second cutting edge (9).

10. The deburring cutter according to claim 1, wherein free surfaces (3, 4) located behind the first and second cutting edges form an undercut behind the cutting edges (8, 9).

11. The deburring cutter according to claim 1, wherein when viewed opposite the rotation direction (15), the control surface (5) is located behind the free edge (21).

12. The deburring cutter according to claim 10, wherein a triangular wedge (17) is formed between the free surface (4) of the second cutting edge (9) and the control surface (5).

13. The deburring cutter according to claim 10, wherein, when viewed opposite the rotation direction (15), the boundary lines of the free surfaces (3-4) and the at least one control surface (5) extend behind the cutting edges and the free edge (8, 9, 21) in a straight or arcuate manner.

14. The deburring cutter according to claim 1, wherein a crowned sliding surface (7) is located following the control surface (5), forming an end face that terminates the cutter (1) radially outward with respect to the rotation axis (14).

15. The deburring cutter according to claim 1, wherein a face (6) for chip removal extends at least from the cutting edges (8, 9) in the direction of the rotation axis (14).

16. The deburring cutter according to claim 15, wherein the face (6) also extends from the free edge (21) and/or from an outer sliding surface (7) radially, with respect to the rotation axis (14), in the direction of the rotation axis (14).

* * * * *

UNITED STATES PATENT AND TRADEMARK OFFICE
CERTIFICATE OF CORRECTION

PATENT NO. : 7,273,334 B2  
APPLICATION NO. : 11/081818  
DATED : September 25, 2007  
INVENTOR(S) : Heule It is certified that error appears in the above-identified patent and that said Letters Patent is hereby corrected as shown below:

Column 2, Line 1, "BRIEF SUMMARY OR THE INVENTION" should read -- BRIEF SUMMARY OF THE INVENTION --

Column 4, Line 25, "ten continues" should read -- then continues --

Column 4, Line 30, "does not performs" should read -- does not perform --

Signed and Sealed this

Twenty-fifth Day of December, 2007

JON W. DUDAS  
*Director of the United States Patent and Trademark Office*